(12) United States Patent
Zhang et al.

(10) Patent No.: US 10,178,636 B2
(45) Date of Patent: Jan. 8, 2019

(54) CLOCK SYNCHRONIZATION METHOD AND DEVICE AND COMMUNICATIONS SYSTEM

(71) Applicant: Huawei Technologies Co., Ltd., Shenzhen (CN)

(72) Inventors: Jinfang Zhang, Shanghai (CN); Bojie Li, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 66 days.

(21) Appl. No.: 15/256,538

(22) Filed: Sep. 3, 2016

(65) Prior Publication Data
US 2016/0374041 A1    Dec. 22, 2016

Related U.S. Application Data

(63) Continuation of application No. PCT/CN2014/072912, filed on Mar. 5, 2014.

(51) Int. Cl.
*H04W 56/00*    (2009.01)
*H04J 3/06*    (2006.01)
*H04B 7/26*    (2006.01)

(52) U.S. Cl.
CPC ........ *H04W 56/0015* (2013.01); *H04B 7/269* (2013.01); *H04J 3/0641* (2013.01); *H04J 3/0667* (2013.01)

(58) Field of Classification Search
CPC .. H04W 56/0015; H04B 7/269; H04J 3/0667; H04J 3/0641
See application file for complete search history.

(56) References Cited

U.S. PATENT DOCUMENTS 5,479,409 A * 12/1995 Dupuy ............ H04W 36/0072
370/337
6,714,563 B1    3/2004 Kushi
(Continued)

FOREIGN PATENT DOCUMENTS

CN    1706142 A    12/2005
CN    1918557 A    2/2007
(Continued)

OTHER PUBLICATIONS

Kozakai, Y., et al., "Keeping Clock Accuracy on a Master Clock Failure in Substation Network," 2010 IEEE International Symposium on Precision Clock Synchronization for Measurement, Control and Communication, Sep. 27, 2010, 5 pages.

*Primary Examiner* — Raj Jain
*Assistant Examiner* — Harry H Kim
(74) *Attorney, Agent, or Firm* — Slater Matsil, LLP

(57) ABSTRACT

An embodiment includes a method. The method includes determining, by a first node device in a network, a first master clock according to a first clock data set of the first node device and a first clock data set of another node device in the network, and synchronizing to the first master clock, where the first clock data set includes a first clock domain selection parameter of a node device. The method also includes determining, by the first node device, a second master clock according to a second clock data set of the first node device and a second clock data set of another node device that belongs to a same first node clock domain as the first node device does, and synchronizing to the second master clock, where the second clock data set includes a second clock domain selection parameter of a node device.

15 Claims, 10 Drawing Sheets

(56) References Cited

U.S. PATENT DOCUMENTS

| | | | | |
|---|---|---|---|---|
| 2003/0091022 A1* | 5/2003 | Blanz | ............... | H04B 1/7075 |
| | | | | 370/350 |
| 2005/0182856 A1 | 8/2005 | McKnett | | |
| 2013/0010814 A1* | 1/2013 | Miyabe | ............... | H04J 3/0652 |
| | | | | 370/503 |
| 2013/0301634 A1* | 11/2013 | Ehlers | ............... | H04L 2/4625 |
| | | | | 370/350 |
| 2013/0326259 A1 | 12/2013 | Paul et al. | | |
| 2015/0103818 A1* | 4/2015 | Kuhn | ............... | H04W 56/00 |
| | | | | 370/350 |
| 2015/0200793 A1* | 7/2015 | Baker | ............... | H04B 7/024 |
| | | | | 370/329 |

FOREIGN PATENT DOCUMENTS

| | | |
|---|---|---|
| CN | 101227689 A | 7/2008 |
| CN | 102263630 A | 11/2011 |
| CN | 102664700 A | 9/2012 |
| CN | 102684808 A | 9/2012 |
| CN | 102904662 A | 1/2013 |
| WO | 2013189176 A | 12/2013 |
| WO | 2013189536 A1 | 12/2013 |
| WO | 2013191608 A1 | 12/2013 |

\* cited by examiner

| A first node device determines a first master clock according to a first clock data set of the first node device and a first clock data set of another node device in a network, and synchronizes to the first master clock, where the first clock data set includes a first clock domain selection parameter of a node device | S101 |

| The first node device determines a second master clock according to a second clock data set of the first node device and a second clock data set of another node device that belongs to a same first node clock domain as the first node device does, and synchronizes to the second master clock, where the second clock data set includes a second clock domain selection parameter of a node device, and a node clock domain is a second clock domain | S102 |

FIG. 1

| A first node device sends a first clock data set of the first node device to another node device in a network, and receives a first clock data set sent by the another node device in the network | S201 |

↓

| The first node device determines a first master clock according to the first clock data set of the first node device and the first clock data set of the another node device in the network, and synchronizes to the first master clock | S202 |

↓

| The first node device receives a first notification message sent by a communications controller, where the first notification message is used to instruct the first node device to perform synchronization in a second clock domain with another node device in a first node clock domain | S203 |

↓

| The first node device sends a second clock data set of the first node device to the another node device in the first node clock domain, and receives a second clock data set sent by the another node device in the first node clock domain | S204 |

↓

| The first node device determines a second master clock according to the second clock data set of the first node device and the second clock data set of the another node device that belongs to the same first node clock domain as the first node device does, and synchronizes to the second master clock | S205 |

CLOCK SYNCHRONIZATION METHOD AND DEVICE AND COMMUNICATIONS SYSTEM

CROSS-REFERENCE TO RELATED APPLICATIONS

This application is a continuation of International Application No. PCT/CN2014/072912, filed on Mar. 5, 2014, which is hereby incorporated by reference in its entirety.

TECHNICAL FIELD

Embodiments relate to the field of communications technologies, and in particular, to a clock synchronization method and device and a communications system.

BACKGROUND

In a mobile bearer network, in addition to requirements of a time division multiplexing (TDM) service, a synchronization reference source needs to be provided for a radio base station. A wireless cellular communications system includes a frequency division duplex (FDD) system and a time division duplex (TDD) system. Cells need to keep frequency synchronization in the TDD system, because a same frequency band needs to be used during uplink and downlink communication, cells in an entire network also require strict time synchronization, so as to avoid interference between uplink and downlink transmission. In the FDD system, uplink and downlink are distinguished from each other by using different frequency bands, and although it is not required to distinguish uplink from downlink by time, cells require strict time synchronization, so as to support characteristics, such as a cell handover, multicast, and broadcast. When a user is handed over between base stations, if the base stations do not perform time synchronization, it may cause a channel establishment failure, which affects a handover success rate.

In the prior art, a network-wide clock synchronization method based on the Institute of Electrical and Electronics Engineers (IEEE) 1588 Time Transfer Protocol is provided. In this method, a time source is deployed at a location of a gateway (GW) or a building base band unit-center (BBU-center), and is injected by using the Global Positioning System (GPS), the BeiDou Navigation Satellite System, an atomic clock, or the like; a bearer switching device transfers, according to the IEEE 1588 protocol, a master clock maintained by the time source. However, a synchronization transfer solution in a radio access network that is implemented based on this method is affected by factors, such as stability of a crystal oscillator, precision of a timestamp, asymmetry of a path and a component, a frequency offset of a TC, a filtering algorithm, and a clock path length, which causes low time synchronization precision.

SUMMARY

Embodiments provide a clock synchronization method and device and a communications system, and clock synchronization precision of a radio access network is further improved by means of a hierarchical multi-clock-domain clock synchronization method.

According to a first aspect, a clock synchronization method is provided. The method includes determining, by a first node device in a network, a first master clock according to a first clock data set of the first node device and a first clock data set of another node device in the network, and synchronizing to the first master clock, where the first clock data set includes a first clock domain selection parameter of a node device. The method also includes determining, by the first node device, a second master clock according to a second clock data set of the first node device and a second clock data set of another node device that belongs to a same first node clock domain as the first node device does, and synchronizing to the second master clock, where the second clock data set includes a second clock domain selection parameter of a node device, and the node clock domain is a second clock domain.

According to the first aspect, in a first possible implementation manner, before the determining, by a first node device in a network, a first master clock according to a first clock data set of the first node device and a first clock data set of another node device in the network, the method further includes: sending, by the first node device, the first clock data set of the first node device to the another node device in the network, and receiving the first clock data set sent by the another node device in the network; and before the determining, by the first node device, a second master clock according to a second clock data set of the first node device and a second clock data set of another node device that belongs to a same first node clock domain as the first node device does, the method further includes: sending, by the first node device, the second clock data set of the first node device to the another node device in the first node clock domain, and receiving the second clock data set sent by the another node device in the first node clock domain.

With reference to the first aspect and the first possible implementation manner, in a second possible implementation manner, before the sending, by the first node device, the second clock data set of the first node device to the another node device in the first node clock domain, the method further includes: receiving, by the first node device, a first notification message sent by a communications controller, where the first notification message is used to instruct the first node device to perform synchronization in the second clock domain with the another node device in the first node clock domain.

With reference to the first aspect, the first possible implementation manner, and the second possible implementation manner, in a third possible implementation manner, after the synchronizing to the first master clock, the method further includes: receiving, by the first node device, a second notification message sent by the communications controller, where the second notification message is used to instruct the first node device to perform synchronization in the second clock domain with another node device in a second node clock domain, and carries a second master clock of the second node clock domain; and synchronizing, by the first node device, to the second master clock of the second node clock domain.

With reference to the first aspect, the first possible implementation manner, and the second possible implementation manner, in a fourth possible implementation manner, after the synchronizing to the first master clock, the method further includes: receiving, by the first node device, a second notification message sent by the communications controller, where the second notification message is used to instruct the first node device to perform synchronization in the second clock domain with a node device in a second node clock domain, and carries an instruction for marking the second clock data set of the first node device, where the mark is used to indicate that the second clock data set does not participate in calculation of the BMC algorithm; marking, by the first node device, the second clock data set of the first node device; sending, by the first node device, the marked second clock data set to another node device in the second node clock domain, and receiving a second clock data set sent by the another node device in the second node clock domain; and determining, by the first node device, a second master clock by using the BMC algorithm and according to the unmarked second clock data set in the second clock data set sent by the another node device in the second node clock domain, and synchronizing to the second master clock.

With reference to the first aspect, the first possible implementation manner, and the second possible implementation manner, in a fifth possible implementation manner, after the synchronizing to the first master clock, the method further includes: receiving, by the first node device, a second notification message sent by the communications controller, where the second notification message is used to instruct the first node device to perform synchronization in the second clock domain with another node device in a second node clock domain; receiving, by the first node device, a second clock data set sent by the another node device in the second node clock domain; and determining, by the first node device, a second master clock by using the BMC algorithm and according to second clock data sets of all node devices in the second node clock domain, and synchronizing to the second master clock.

With reference to the first aspect, the first possible implementation manner, the second possible implementation manner, the third possible implementation manner, the fourth possible implementation manner, and the fifth possible implementation manner, in a sixth possible implementation manner, after the determining, by the first node, the second master clock, the method further includes: synchronizing, by the first node device, to the first master clock if determining that a time path from the first node device to a node device to which the second master clock belongs is greater than a time path from the first node device to a node device to which the first master clock belongs.

With reference to the first aspect, the first possible implementation manner, the second possible implementation manner, the third possible implementation manner, the fourth possible implementation manner, the fifth possible implementation manner, and the sixth possible implementation manner, in a seventh possible implementation manner, after the synchronizing to the second master clock, the method further includes: receiving, by the first node device, a third notification message sent by the communications controller, where the third notification message is used to instruct the first node device not to synchronize to the second master clock anymore; and determining, by the first node device, the first master clock according to the first clock data set of the first node device and the received first clock data set of the another node device in the network, and synchronizing to the first master clock.

According to the seventh possible implementation manner, in an eighth possible implementation manner, after the receiving, by the first node device, a third notification message sent by the communications controller, the method further includes: if determining that the second clock data set of the first node device has been marked, deleting, by the first node device, the mark, where the mark is used to indicate that the second clock data set does not participate in calculation of the BMC algorithm.

According to a second aspect, a node device is provided. The node device is a first node device in a network, and the node device includes: a first processing unit, configured to determine a first master clock according to a first clock data set of the first node device and a first clock data set of another node device in the network, and synchronize to the first master clock, where the first clock data set includes a first clock domain selection parameter of a node device. The node device also includes a second processing unit, configured to determine a second master clock according to a second clock data set of the first node device and a second clock data set of another node device that belongs to a same first node clock domain as the first node device does, and synchronize to the second master clock, where the second clock data set includes a second clock domain selection parameter of a node device, and the node clock domain is a second clock domain.

According to the second aspect, in a first possible implementation manner, the node device further includes: a first sending unit, configured to send the first clock data set of the first node device to the another node device in the network. The node device also includes a first receiving unit, configured to receive the first clock data set sent by the another node device in the network. The node device also includes a second sending unit, configured to send the second clock data set of the first node device to the another node device in the first node clock domain. The node device also includes a second receiving unit, configured to receive the second clock data set sent by the another node device in the first node clock domain.

With reference to the second aspect and the first possible implementation manner, in a second possible implementation manner, the second receiving unit is further configured to receive a first notification message sent by a communications controller, where the first notification message is used to instruct the first node device to perform synchronization in the second clock domain with the another node device in the first node clock domain.

With reference to the second aspect, the first possible implementation manner, and the second possible implementation manner, in a third possible implementation manner, the second receiving unit is further configured to receive a second notification message sent by the communications controller, where the second notification message is used to instruct the first node device to perform synchronization in the second clock domain with another node device in a second node clock domain, and carries a second master clock of the second node clock domain; and the second processing unit is further configured to synchronize to the second master clock of the second node clock domain.

With reference to the second aspect, the first possible implementation manner, and the second possible implementation manner, in a fourth possible implementation manner, the second receiving unit is further configured to receive a second notification message sent by the communications controller, where the second notification message is used to instruct the first node device to perform synchronization in the second clock domain with a node device in a second node clock domain, and carries an instruction for marking the second clock data set of the first node device, where the mark is used to indicate that the second clock data set does not participate in calculation of a BMC algorithm; the second processing unit is further configured to mark the second clock data set of the first node device; the first sending unit is further configured to send the marked second clock data set to another node device in the second node clock domain; the first receiving unit is further configured to receive a second clock data set sent by the another node device in the second node clock domain; and the second processing unit is further configured to determine a second master clock by using the BMC algorithm and according to the unmarked second clock data set in the second clock data set sent by the another node device in the second node clock domain, and synchronize to the second master clock.

With reference to the second aspect, the first possible implementation manner, and the second possible implementation manner, in a fifth possible implementation manner, the second receiving unit is further configured to receive a second notification message sent by the communications controller, where the second notification message is used to instruct the first node device to perform synchronization in the second clock domain with another node device in a second node clock domain; the first receiving unit is further configured to receive a second clock data set sent by the another node device in the second node clock domain; and the second processing unit is further configured to determine a second master clock by using the BMC algorithm and according to second clock data sets of all node devices in the second node clock domain, and synchronize to the second master clock.

With reference to the second possible implementation manner, the third possible implementation manner, the fourth possible implementation manner, and the fifth possible implementation manner, in a sixth possible implementation manner, the node device further includes: a comparison unit, configured to: after the second processing unit determines the second master clock, if determining that a time path from the first node device to a node device to which the second master clock belongs is greater than a time path from the first node device to a node device to which the first master clock belongs, enable the first processing unit to determine to synchronize to the first master clock.

With reference to the second aspect, the second possible implementation manner, the third possible implementation manner, the fourth possible implementation manner, and the fifth possible implementation manner, in a seventh possible implementation manner, the second receiving unit is further configured to receive a third notification message sent by the communications controller, where the third notification message is used to instruct the first node device not to synchronize to the second master clock anymore; and the first processing unit is further configured to determine the first master clock according to the first clock data set of the first node device and the received first clock data set of the another node device in the network, and synchronize to the first master clock.

According to the seventh possible implementation manner, in an eighth possible implementation manner, the node device further includes: a deletion unit, configured to: after the second receiving unit receives the third notification message, if determining that the second clock data set of the first node device has been marked, delete the mark, where the mark is used to indicate that the second clock data set does not participate in calculation of the BMC algorithm.

According to a third aspect, a node device is provided, where the node device is a first node device in a network. The node device includes: a processor, configured to determine a first master clock according to a first clock data set of the first node device and a first clock data set of another node device in the network, and synchronize to the first master clock, where the first clock data set includes a first clock domain selection parameter of a node device. The processor is further configured to determine a second master clock according to a second clock data set of the first node device and a second clock data set of another node device that belongs to a same first node clock domain as the first node device does, and synchronize to the second master clock, where the second clock data set includes a second clock domain selection parameter of a node device, and the node clock domain is a second clock domain.

According to the third aspect, in a first possible implementation manner, the node device further includes: a transmitter, configured to send the first clock data set of the first node device to the another node device in the network; and a receiver, configured to receive the first clock data set sent by the another node device in the network. The transmitter is further configured to send the second clock data set of the first node device to the another node device in the first node clock domain. The receiver is further configured to receive the second clock data set sent by the another node device in the first node clock domain.

With reference to the third aspect and the first possible implementation manner, in a second possible implementation manner, the receiver is further configured to receive a first notification message sent by a communications controller, where the first notification message is used to instruct the first node device to perform synchronization in the second clock domain with the another node device in the first node clock domain.

With reference to the third aspect, the first possible implementation manner, and the second possible implementation manner, in a third possible implementation manner, the receiver is further configured to receive a second notification message sent by the communications controller, where the second notification message is used to instruct the first node device to perform synchronization in the second clock domain with another node device in a second node clock domain, and carries a second master clock of the second node clock domain; and the processor is further configured to synchronize to the second master clock of the second node clock domain.

With reference to the third aspect, the first possible implementation manner, and the second possible implementation manner, in a fourth possible implementation manner, the receiver is further configured to receive a second notification message sent by the communications controller, where the second notification message is used to instruct the first node device to perform synchronization in the second clock domain with a node device in a second node clock domain, and carries an instruction for marking the second clock data set of the first node device, where the mark is used to indicate that the second clock data set does not participate in calculation of the BMC algorithm; the processor is further configured to mark the second clock data set of the first node device. The transmitter is further configured to send the marked second clock data set to another node device in the second node clock domain. The receiver is further configured to receive a second clock data set sent by the another node device in the second node clock domain. The processor is further configured to determine a second master clock by using the BMC algorithm and according to the unmarked second clock data set in the second clock data set sent by the another node device in the second node clock domain, and synchronize to the second master clock.

With reference to the third aspect, the first possible implementation manner, and the second possible implementation manner, in a fifth possible implementation manner, the receiver is further configured to receive a second notification message sent by the communications controller, where the second notification message is used to instruct the first node device to perform synchronization in the second clock domain with another node device in a second node clock domain; and receive a second clock data set sent by the another node device in the second node clock domain. The processor is further configured to determine a second master clock by using the BMC algorithm and according to second clock data sets of all node devices in the second node clock domain, and synchronize to the second master clock.

With reference to the second possible implementation manner, the third possible implementation manner, the fourth possible implementation manner, and the fifth possible implementation manner, in a sixth possible implementation manner, the processor is further configured to: after determining the second master clock, if determining that a time path from the first node device to a node device to which the second master clock belongs is greater than a time path from the first node device to a node device to which the first master clock belongs, synchronize to the first master clock.

With reference to the third aspect, the second possible implementation manner, the third possible implementation manner, the fourth possible implementation manner, and the fifth possible implementation manner, in a seventh possible implementation manner, the receiver is further configured to receive a third notification message sent by the communications controller, where the third notification message is used to instruct the first node device not to synchronize to the second master clock anymore. The processor is further configured to determine the first master clock according to the first clock data set of the first node device and the received first clock data set of the another node device in the network, and synchronize to the first master clock.

According to the seventh possible implementation manner, in an eight possible implementation manner, the processor is further configured to: after the receiver receives the third notification message, if determining that the second clock data set of the first node device has been marked, delete the mark, where the mark is used to indicate that the second clock data set does not participate in calculation of the BMC algorithm.

According to a fourth aspect, a communications system is provided. The system includes at least two node devices according to any one of the foregoing second aspect and implementation manners of the second aspect.

According to the fourth aspect, in a first possible implementation manner, the system further includes a communications controller, configured to: send a first notification message to a first node device in the at least two node devices, where the first notification message is used to instruct the first node device to perform synchronization in a second clock domain with another node device in the first node clock domain; send a second notification message to the first node device, where the second notification message is used to instruct the first node device to perform synchronization in the second clock domain with another node device in a second node clock domain, and carries a second master clock of the second node clock domain; or, the second notification message is used to instruct the first node device to perform synchronization in the second clock domain with a node device in a second node clock domain, and carries an instruction for marking a second clock data set of the first node device, where the mark is used to indicate that the second clock data set does not participate in calculation of the BMC algorithm; or, the second notification message is used to instruct the first node device to perform synchronization in the second clock domain with another node device in a second node clock domain; and send a third notification message to the first node device, where the third notification message is used to instruct the first node device not to synchronize to the second master clock anymore.

According to a fifth aspect, a communications system is provided, including: at least two node devices according to any one of the foregoing third aspect and implementation manners of the third aspect.

According to the fifth aspect, in a first possible implementation manner, the system further includes: a communications controller, configured to: send a first notification message to a first node device in the at least two node devices, where the first notification message is used to instruct the first node device to perform synchronization in a second clock domain with another node device in the first node clock domain; send a second notification message to the first node device, where the second notification message is used to instruct the first node device to perform synchronization in the second clock domain with another node device in a second node clock domain, and carries a second master clock of the second node clock domain; or, the second notification message is used to instruct the first node device to perform synchronization in the second clock domain with a node device in a second node clock domain, and carries an instruction for marking a second clock data set of the first node device, where the mark is used to indicate that the second clock data set does not participate in calculation of the BMC algorithm; or, the second notification message is used to instruct the first node device to perform synchronization in the second clock domain with another node device in a second node clock domain; and send a third notification message to the first node device, where the third notification message is used to instruct the first node device not to synchronize to the second master clock anymore.

According to the clock synchronization method and device and the communications system provided in the embodiments, a first node device in a network determines a first master clock according to a first clock data set of the first node device and a first clock data set of another node device in the network, and synchronizes to the first master clock, where the first clock data set includes a first clock domain selection parameter of a node device; and the first node device determines a second master clock according to a second clock data set of the first node device and a second clock data set of another node device that belongs to a same first node clock domain as the first node device does, and synchronizes to the second master clock, where the second clock data set includes a second clock domain selection parameter of a node device, and a node clock domain is a second clock domain. In this way, by means of a hierarchical multi-clock domain clock synchronization method, a first node in a different clock domain may compute a master clock of the clock domain and synchronize to the master clock, which avoids an error accumulation problem caused by an excessively long transmission path of the master clock. In addition, the first node device implements high-precision synchronization when located in a first clock domain, and the first node device can implement higher-precision synchronization when located in a second clock domain, which not only meets a further requirement on higher precision in the second clock domain, but also avoids a problem of extremely high deployment costs caused by extremely high precision improvement in an entire network.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 1 is a flowchart of an embodiment of a clock synchronization method;

FIG. 2 is a flowchart of another embodiment of a clock synchronization method;

DETAILED DESCRIPTION OF ILLUSTRATIVE EMBODIMENTS

Figure 3:
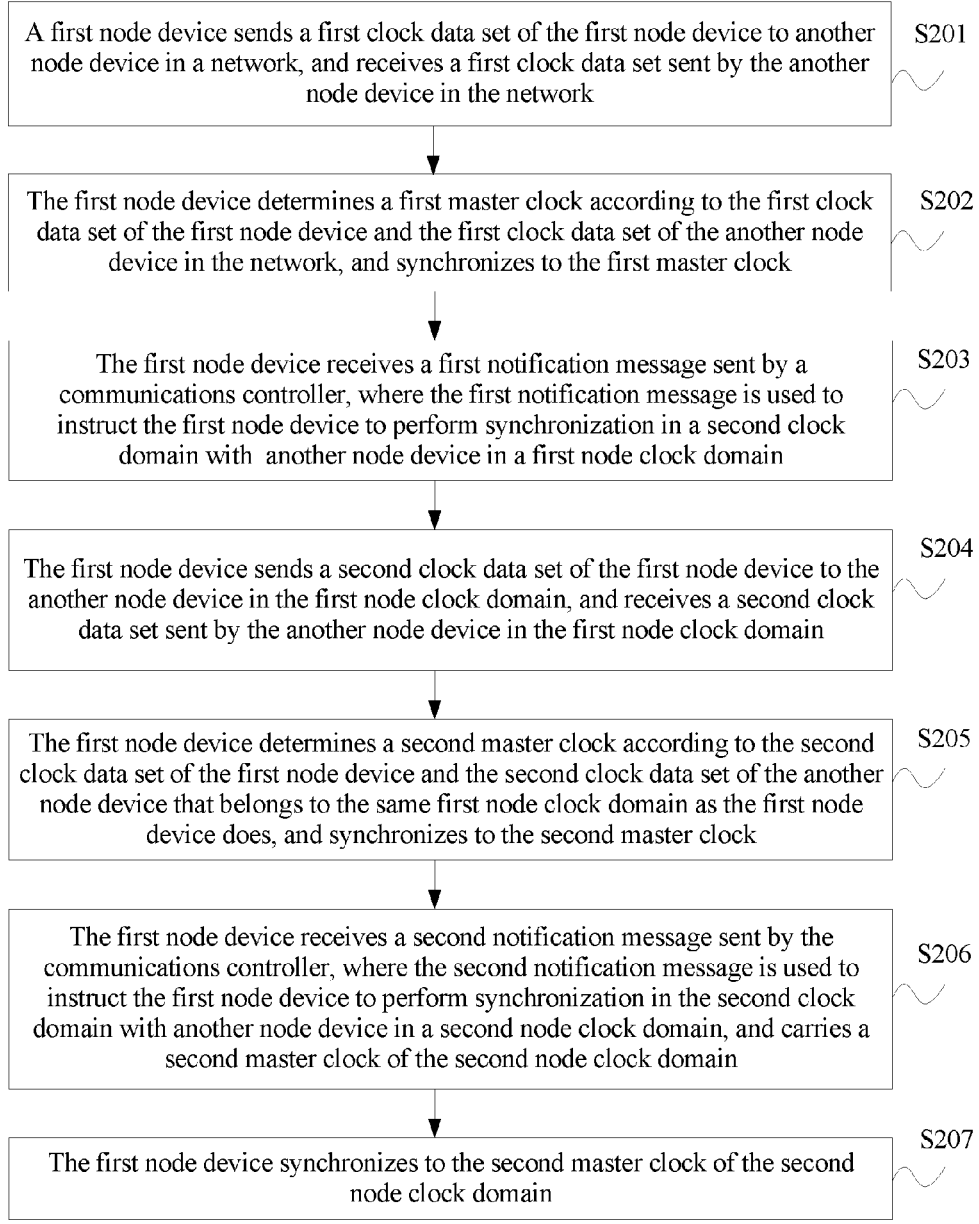
FIG. 3 is a flowchart of still another embodiment of a clock synchronization method.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be noted that in a network that bears a mobile device, an access node device, a control node device, and the like, a synchronization reference source needs to be provided for each node based on problems such as service requirements. In addition, with the introduction of some new wireless modulation technologies and transmit and receive technologies for increasing a system capacity, such as application of an orthogonal frequency division multiplexing (OFDM) technology and a coordinated multi-point (CoMP) technology, higher precision requirements on time and frequency synchronization between node devices are further imposed.

The embodiments are described by using node devices in a network, for example, first node devices, as the foregoing control node and the foregoing access node, and the network may be an existing network architecture such as a cellular network.

FIG. 1 is a flowchart of an embodiment of a clock synchronization method. As shown in FIG. 1, the method in this embodiment may include the following steps.

S101. A first node device determines a first master clock according to a first clock data set of the first node device and a first clock data set of another node device in a network, and synchronizes to the first master clock, where the first clock data set includes a first clock domain selection parameter of a node device.

It should be noted that in the prior art, each slave clock generally implements time synchronization with a master clock deployed at a location of a GW or a BBU-center. However, in this clock synchronization method, a slave clock deployed on a remoter node device on a time path has lower synchronization precision. For example, in a scenario in which synchronization is performed by using the IEEE 1588 protocol and the like, when a protocol packet is being transmitted between a master clock node device and a remoter slave clock node device, each node device through which the protocol packet passes stamps an ingress timestamp when locally receiving the protocol packet, and then stamps an egress timestamp when sending the protocol packet. In this way, during synchronization between the slave clock and the master clock, impact of a residence time at each node device, that is, a difference between the ingress timestamp and the egress timestamp, on synchronization precision is considered. That is, a transmission delay is a final ingress timestamp minus an initial egress timestamp minus the sum of residence times. However, an error exists in a time maintained by each node device; therefore, when there is an excessively long clock path from a time source to a node device, that is, when many hops exist, timestamp error accumulation is caused, and there is a relatively large accumulated error.

In this embodiment, a best master clock may be computed on each first node device by using a best master clock (BMC) algorithm, and each first node device synchronizes to the best master clock, thereby reducing an error generated in a transmission process and improving time synchronization precision.

For example, the first node device determines the first master clock according to the first clock data set obtained by statistics collection by the first node device and the received first clock data set of the another node device in the network, and synchronizes to the first master clock, where the first clock data set includes the first clock domain selection parameter of the node device, and the first clock domain selection parameter may be a clock domain selection parameter used to mark that the node device belongs to a first clock domain.

The first clock data set is locally maintained by each first node device and is used as basic input of the best master clock algorithm and the like. Parameter attributes in the first clock data set include: static, dynamic, and configurable. A static parameter reflects an inherent physical or operation characteristic of a clock or a protocol; a dynamic parameter may change when a protocol operation or an environment changes; and a configurable parameter may be configured by using a management message or implementation-specific configuration means. The first clock domain selection parameter includes various attribute parameters, such as a priority, a quality level, precision, stability, a clock domain, a clock identity, an attribute indicating one-step/two-step synchronization in protocol use, and a path attribute. The priority and a time domain are configurable parameters; the quality level, the precision, and the stability are dynamic parameters.

Further, the first clock domain may be the foregoing entire network, such as a cellular network, and a clock domain of each first node device may indicate that the first node device is located in the first clock domain. When a clock domain of a first node device only indicates that the first node device is located in the first clock domain, the first node device determines a first master clock by using the BMC algorithm and according to actual values of the foregoing parameters. In addition, the first node device can determine a first node device to which the first master clock belongs. Generally, the first node device to which the first master clock belongs may be a GW, a BBU-center, or a switch connected to the GW or the BBU-center.

Based on the foregoing method, for a first node device that has no opportunity to participate in coordination, because only microsecond-level synchronization needs to be met between first node devices, an ordinary switch having an IEEE 1588 synchronization function may be used as a switching node device in the network, and no special requirement on a crystal oscillator and the like is imposed, which can reduce networking costs.

S102. The first node device determines a second master clock according to a second clock data set of the first node device and a second clock data set of another node device that belongs to a same first node clock domain as the first node device does, and synchronizes to the second master clock, where the second clock data set includes a second clock domain selection parameter of a node device, and a node clock domain is a second clock domain.

For example, the second clock data set includes the second clock domain selection parameter of the node device, and the second clock domain selection parameter may be a clock domain selection parameter obtained after precision improvement processing is performed on the first clock domain selection parameter. Alternatively, the second clock domain selection parameter may be a clock domain selection parameter used to mark that the node device belongs to the second clock domain.

It should be noted that a second clock data set of each node device is locally maintained by each first node device and includes a second clock domain selection parameter, where the second clock domain selection parameter is a clock domain selection parameter obtained after precision improvement processing is performed on a first clock domain selection parameter, and includes various attribute parameters, such as a priority, a quality level, precision, stability, a clock domain, a clock identity, an attribute indicating one-step/two-step synchronization in protocol use, and a path attribute. The second clock domain selection parameter is a higher-precision parameter formed after adjustment is made based on an actual parameter, and may be formed by adjusting one or more actual parameters. For example, one or more parameters, such as the priority, in the first clock domain selection parameter all are subtracted by a constant, so that the priority changes from 1 to 0, or changes from 2 to 1. Because the BMC algorithm is preset, a clock with a smaller priority value may have higher precision; precision of a master clock whose priority is 0 is higher than precision of a master clock whose priority is 1. For example, a priority of a clock that has nanosecond-level precision may be set to 0, and a priority of a clock that has millisecond-level precision may be set to 1. The priority parameter is merely used as an example herein and no limitation is imposed thereon, and any BMC algorithm in which master clocks that have different precision are obtained by adjusting a first clock domain selection parameter and a second clock domain selection parameter falls within the protection scope.

Further, the node clock domain may be a CoMP cell. In an architecture of the CoMP cell, if there is no precise synchronization between first node devices that participate in coordination, a signal of a different first node device arrives at a user at a different time, which may cause mismatching of a precoding matrix. Therefore, transmission in the CoMP cell cannot reach an expected gain, thereby greatly deteriorating system performance. All first node devices in one node clock domain in the present invention belong to one second clock domain. According to the foregoing parameter adjustment and algorithm, precision may be adjusted to a nanosecond level, so as to meet a requirement on precision in the architecture of the CoMP cell.

Still further, a CoMP cell is generated dynamically, that is, a node clock domain such as a first node clock domain is generated dynamically. Therefore, when a first node clock domain is generated dynamically according to a channel state, first node devices in the first node clock domain may be instructed to obtain a clock in the second clock domain by using second clock data sets, use the clock as a second master clock, and synchronize to the second master clock to implement precise time synchronization; or when the first node clock domain is dissolved, the first node devices may be instructed to re-compute a first master clock and synchronize to the first master clock. It should be noted that a first node clock domain being a CoMP cell is merely used as an example for description in this embodiment, and no limitation is imposed thereon; when the first node clock domain is combined with a second node clock domain, CoMP cells may not be combined.

According to the clock synchronization method provided in this embodiment, a first node device in a network determines a first master clock according to a first clock data set of the first node device and a first clock data set of another node device in the network, and synchronizes to the first master clock, where the first clock data set includes a first clock domain selection parameter of a node device; and the first node device determines a second master clock according to a second clock data set of the first node device and a second clock data set of another node device that belongs to a same first node clock domain as the first node device does, and synchronizes to the second master clock, where the second clock data set includes a second clock domain selection parameter of a node device, and a node clock domain is a second clock domain. In this way, by means of a hierarchical multi-clock domain clock synchronization method, a first node in a different clock domain may compute a master clock of the clock domain and synchronize to the master clock, which avoids an error accumulation problem caused by an excessively long transmission path of the master clock. In addition, the first node device implements high-precision synchronization when located in a first clock domain, and the first node device can implement higher-precision synchronization when located in a second clock domain, which not only meets a further requirement on higher precision in the second clock domain, but also avoids a problem of extremely high deployment costs caused by extremely high precision improvement in an entire network.

FIG. 2 is a flowchart of another embodiment of a clock synchronization method. As shown in FIG. 2, the method in this embodiment may include the following steps.

It should be noted that when a first node device has belonged to a first node clock domain, steps S201, S202, and S203 may not be performed anymore; however, that a first node device is first located in a network and then joins a first node clock domain is described in this embodiment, and there is a sequence relationship among the following steps S201, S202, and S203.

S201. A first node device sends a first clock data set of the first node device to another node device in a network, and receives a first clock data set sent by the another node device in the network.

S202. The first node device determines a first master clock according to the first clock data set of the first node device and the first clock data set of the another node device in the network, and synchronizes to the first master clock.

The first clock data set includes a first clock domain selection parameter of a node device.

Further, the first node device may determine the first master clock by using a BMC algorithm and by using the first clock domain selection parameter, where the first clock domain selection parameter includes at least one of the following parameters: a priority, a quality level and precision, stability, a clock domain, a clock identity, a synchronization attribute, and a path attribute, where the clock domain is a first clock domain, and the first clock domain selection parameter is a clock domain selection parameter used to mark that the node device belongs to the first clock domain.

S203. The first node device receives a first notification message sent by a communications controller, where the first notification message is used to instruct the first node device to perform synchronization in a second clock domain with another node device in a first node clock domain.

For example, when the first node device and several other neighboring node devices form the first node clock domain, the first node device may determine, by using the received first notification message sent by the communications controller, that the first node device has joined the first node clock domain, and then adjust, to a second clock data set, a first clock data set sent to the another node device in the first node clock domain.

S204. The first node device sends a second clock data set of the first node device to the another node device in the first node clock domain, and receives a second clock data set sent by the another node device in the first node clock domain.

Further, each node device in the second clock domain receives a second clock data set sent by another node device in the current second clock domain; in addition, each node device further receives a first clock data set sent by another node device not in the current second clock domain, and a first clock data set sent by a node device that is in another second clock domain and is not in the current second clock domain.

S205. The first node device determines a second master clock according to the second clock data set of the first node device and the second clock data set of the another node device that belongs to the same first node clock domain as the first node device does, and synchronizes to the second master clock.

The second clock data set includes a second clock domain selection parameter of a node device, and the second clock domain selection parameter is a clock domain selection parameter obtained after precision improvement processing is performed on the first clock domain selection parameter. Regarding the precision improvement processing method for the second clock domain selection parameter, refer to the foregoing embodiment; details are not described herein again.

Further, each node device in the second clock domain may select a second master clock by using the BMC algorithm, and a master clock node device may send a node identifier of itself to the communications controller, so that the communications controller learns that the second master clock in the current first node clock domain belongs to which node device.

Still further, after obtaining the second master clock through computation, each node device can precisely synchronize, according to the IEEE 1588 protocol, to the second master clock obtained through computation.

Further, FIG. 3 is a flowchart of still another embodiment of a clock synchronization method. After step S205, if the first node device joins another node clock domain, which is denoted as a second node clock domain, step S206 is to be performed. It should be noted that S206 may also be performed after S202, and the example in this embodiment is not considered as a limitation.

S206. The first node device receives a second notification message sent by the communications controller, where the second notification message is used to instruct the first node device to perform synchronization in the second clock domain with another node device in a second node clock domain, and carries a second master clock of the second node clock domain.

S207. The first node device synchronizes to the second master clock of the second node clock domain.

Further, because the second notification message has carried the second master clock of the second node clock domain, the first node device does not need to compute the second master clock again. The second master clock may be obtained through computation by an original node device in the second node clock domain and then sent to the communications controller.

Figure 4:
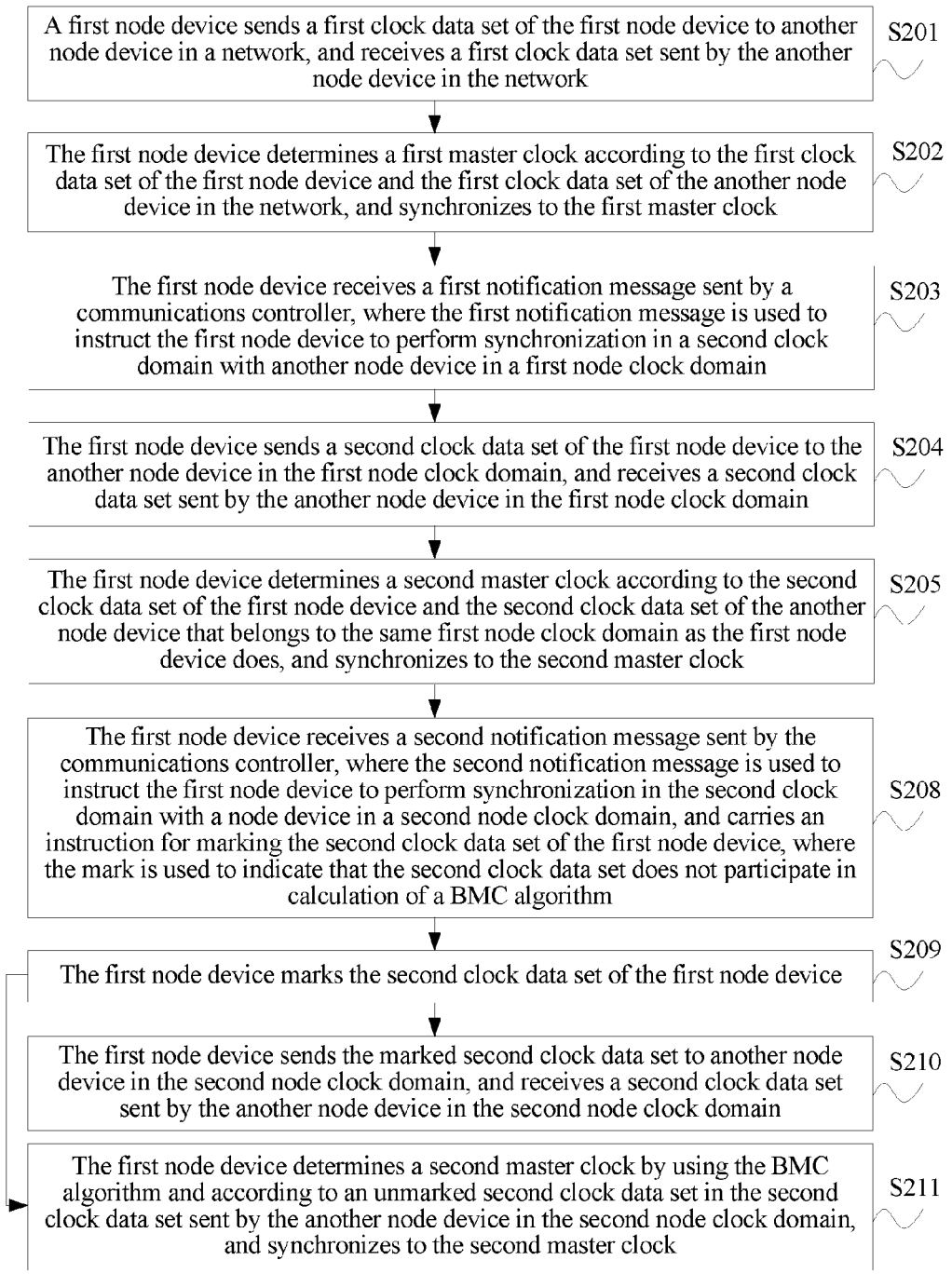
FIG. 4 is a flowchart of yet another embodiment of a clock synchronization method.

Alternatively, FIG. 4 is a flowchart of yet another embodiment of a clock synchronization method. As shown in FIG. 4, after step S205, step S208 may further be performed. It should be noted that S208 may also be performed after S202, and the example in this embodiment is not considered as a limitation.

S208. The first node device receives a second notification message sent by the communications controller, where the second notification message is used to instruct the first node device to perform synchronization in the second clock domain with a node device in a second node clock domain, and carries an instruction for marking the second clock data set of the first node device, where the mark is used to indicate that the second clock data set does not participate in calculation of a BMC algorithm.

S209. The first node device marks the second clock data set of the first node device.

For example, when a node device joins a node clock domain, for example, when the foregoing first node device joins the second node clock domain, each node device in the second node clock domain remains an original second master clock, so as to avoid that each node device in the second node clock domain reselects and re-synchronizes to a second master clock, and consequently, coordinated communication performance is affected. The communications controller may indicate the second master clock in the second node clock domain to the first node device in a manner of directly carrying the second master clock of the second node clock domain by using the notification in the foregoing embodiment, or in a manner, of this embodiment, in which the first node device is instructed to join the second node clock domain, and the first node device may be instructed to re-compute a first master clock of the second node clock domain.

In this case, a problem that may occur is: A better second master clock may be obtained through computation according to the second clock domain selection parameter of the first node device, which causes: all other node devices in the second node clock domain synchronize to the better second master clock, where performing reselection on and re-synchronization with the second master clock affects coordinated communication performance. In conclusion, the second clock domain selection parameter of the newly joined first node device is marked, so that the marked second clock domain selection parameter is ignored in a process of obtaining the second master clock through computation by using the BMC algorithm.

S210. The first node device sends the marked second clock data set to another node device in the second node clock domain, and receives a second clock data set sent by the another node device in the second node clock domain.

S211. The first node device determines a second master clock by using the BMC algorithm and according to an unmarked second clock data set in the second clock data set sent by the another node device in the second node clock domain, and synchronizes to the second master clock.

Further, first node devices may determine, according to clock domains in second clock domain selection parameters, that these second clock domain selection parameters belong to the second node clock domain. Because each node device sends a first clock data set in a broadcast manner and sends a second clock data set in a multicast manner, the first node device may receive first clock data sets of many other node clock domains. Therefore, the first node device needs to compute the second master clock of the second clock domain according to a clock domain parameter.

Still further, when one or more node devices from the first node clock domain join the second node clock domain at the same time, the communications controller instructs to combine multiple second clock domains into one second clock domain. For example, one first node clock domain and one second node clock domain are combined into one third node clock domain. In this scenario, the first node clock domain and the second node clock domain already have their respective second master clocks, and each node device in the first node clock domain or the second node clock domain has obtained a respective second master clock and has synchronized to the second master clock. In this case, the communications controller may select, as a second master clock of the combined second clock domain, one of the two master clocks according to a network topology. A selection criterion may be that a node device to which the second master clock belongs has shortest time paths to all node devices that are in the first node clock domain and the second node clock domain. For example, the second master clock of the first node clock domain is selected, and the second master clock is carried in a notification sent to each node device in the second node clock domain, so that each node device in the second node clock domain synchronizes to the second master clock of the first node clock domain; or, an instruction for marking a second clock data set of the node device is carried in a notification sent to each node device in the second node clock domain, where the mark is used to represent that the second clock data set does not participate in calculation of the BMC algorithm.

Figure 5:
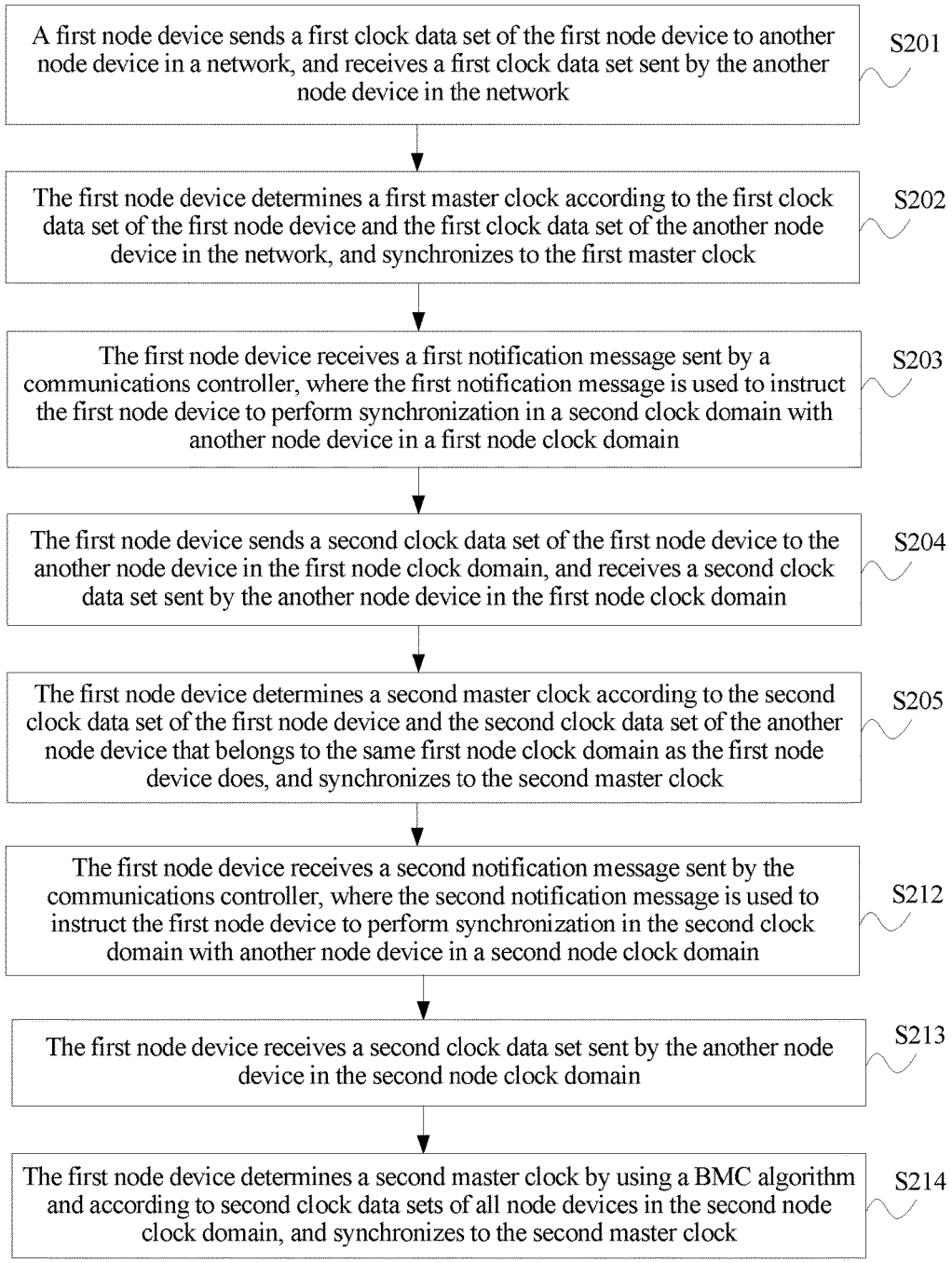
FIG. 5 is a flowchart of yet another embodiment of a clock synchronization method.

Still further, FIG. 5 is a flowchart of yet another embodiment of a clock synchronization method. As shown in FIG. 5, after step S205, step S212 may further be performed.

S212. The first node device receives a second notification message sent by the communications controller, where the second notification message is used to instruct the first node device to perform synchronization in the second clock domain with another node device in a second node clock domain.

S213. The first node device receives a second clock data set sent by the another node device in the second node clock domain.

S214. The first node device determines a second master clock by using a BMC algorithm and according to second clock data sets of all node devices in the second node clock domain, and synchronizes to the second master clock.

Figure 6:
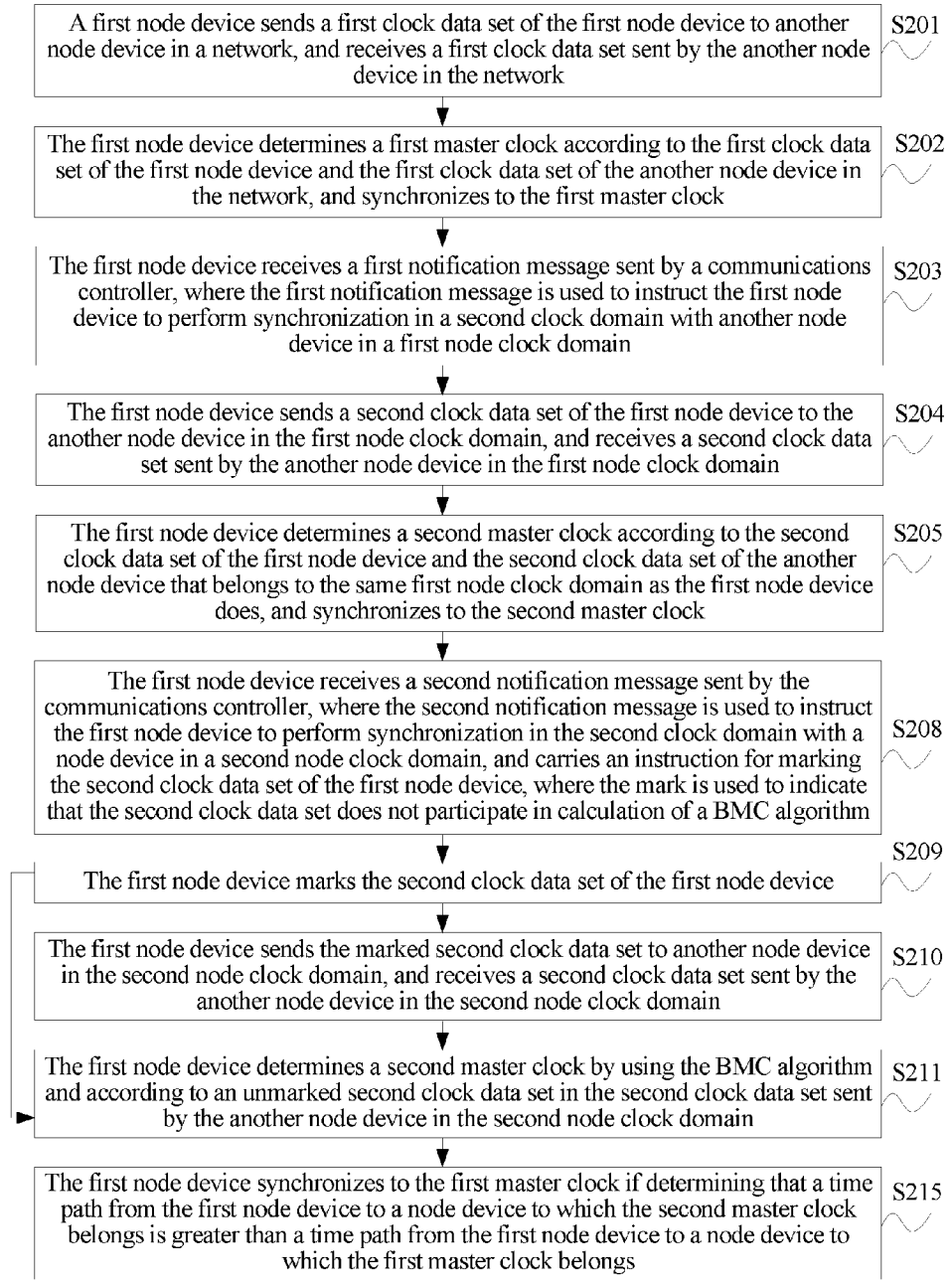
FIG. 6 is a flowchart of yet another embodiment of a clock synchronization method.

Further, FIG. 6 is a flowchart of yet another embodiment of a clock synchronization method. As shown in FIG. 6, after step S211, the method may further include step S215. It should be noted that S215 may be performed after any first node device determines a second master clock, or may be performed after any first node device is handed over to another node clock domain after synchronizing to a second master clock, and determines a second master clock of the another node clock domain. That S215 is performed after S211 is merely used as an example for description in this embodiment, and no limitation is imposed thereon. That S215 is performed after S208 or S214 falls within the protection scope, and S211 in this embodiment is not exactly the same as the S211.

S211. The first node device determines a second master clock by using the BMC algorithm and according to an unmarked second clock data set in the second clock data set sent by the another node device in the second node clock domain.

S215. The first node device synchronizes to the first master clock if determining that a time path from the first node device to a node device to which the second master clock belongs is greater than a time path from the first node device to a node device to which the first master clock belongs.

That is, if the first node device first synchronizes to the second master clock of the first node clock domain, and then is handed over to the second node clock domain, it causes: the time path from the first node device to the node device to which the second master clock of the second node clock domain belongs is greater than the time path from the first node device to the node device to which the first master clock belongs. In this case, the first node device needs to re-synchronize to the first master clock.

Further, the communications controller knows a node device to which each selected second master clock belongs and a node device to which each selected first master clock belongs, a second clock domain selection parameter includes a path attribute, and a time path from each node device to another node device can be determined according to a network topology structure. Therefore, it is easy for each node device to acquire a time path to a node device, to which a first master clock belongs, in a network in which each node device is located, and a time path to a node device, to which a second master clock belongs, in the network in which each node device is located. In addition, precision improvement of the second master clock is determined based on that a time path of each node device in a node clock domain is shorter. If the time path from the first node device to the node device to which the second master clock belongs is greater than the time path from the first node device to the node device to which the first master clock belongs, an advantage of a shorter path is lost, and synchronization between the first node device and the high-precision second master clock is not precise anymore. Therefore, the first node device can re-synchronize to the first master clock of a shorter time path.

According to the clock synchronization method provided in this embodiment, a first node device in a network determines a first master clock according to a first clock data set of the first node device and a first clock data set of another node device in the network, and synchronizes to the first master clock, where the first clock data set includes a first clock domain selection parameter of a node device; and the first node device determines a second master clock according to a second clock data set of the first node device and a second clock data set of another node device that belongs to a same first node clock domain as the first node device does, and synchronizes to the second master clock, where the second clock data set includes a second clock domain selection parameter of a node device, and a node clock domain is a second clock domain. In this way, by means of a hierarchical multi-clock domain clock synchronization method, a first node in a different clock domain may compute a master clock of the clock domain and synchronize to the master clock, which avoids an error accumulation problem caused by an excessively long transmission path of the master clock. In addition, the first node device implements high-precision synchronization when located in a first clock domain, and the first node device can implement higher-precision synchronization when located in a second clock domain, which not only meets a further requirement on higher precision in the second clock domain, but also avoids a problem of extremely high deployment costs caused by extremely high precision improvement in an entire network.

Figure 7:
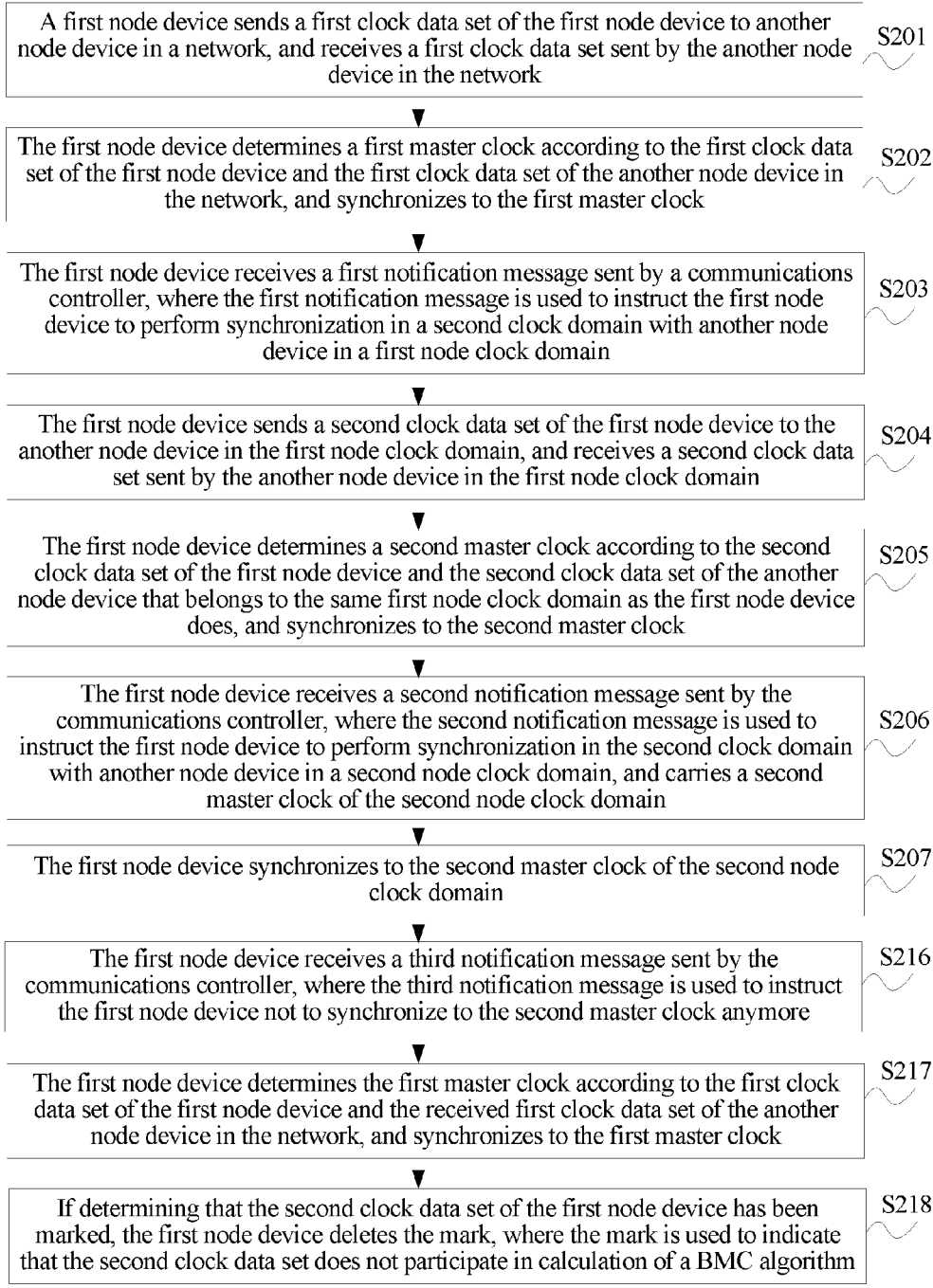
FIG. 7 is a flowchart of yet another embodiment of a clock synchronization method.

FIG. 7 is a flowchart of yet another embodiment of a clock synchronization method. As shown in FIG. 7, the method in this embodiment is implemented after steps S201 to S207 in the foregoing embodiment, which is merely used as an example in this embodiment. Step S216 may be performed after any synchronization with a second master clock, which is not limited to a case enumerated in this embodiment. After step S207, the method in this embodiment further includes the following steps.

S216. The first node device receives a third notification message sent by the communications controller, where the third notification message is used to instruct the first node device not to synchronize to the second master clock anymore.

S217. The first node device determines the first master clock according to the first clock data set of the first node device and the received first clock data set of the another node device in the network, and synchronizes to the first master clock.

For example, when a node device quits the second node clock domain, and the node device is not a node device in which the second master clock is located, another node device that does not quit the second node clock domain also does not need to re-compute the second master clock. As a node device that quits the second node clock domain, for example, a first node device, does not belong to the second node clock domain anymore, re-computes a first master clock according to a currently received first clock data set by using a first clock domain selection parameter, and synchronizes to the first master clock.

Further, if a third node clock domain is split into two or more node clock domains, for example, a first node clock domain and a second node clock domain, a first node device belongs to the first node clock domain, a second node device belongs to the second node clock domain, and a second master clock of the original third node clock domain belongs to the first node device, the second master clock does not need to be re-computed in the first node clock domain used as a node clock domain that has the first node device; the second node clock domain does not have the first node device, and each node device in the second node clock domain needs to compute the second master clock according to a second clock data set in the second node clock domain again.

S218. If determining that the second clock data set of the first node device has been marked, the first node device deletes the mark, where the mark is used to indicate that the second clock data set does not participate in calculation of the BMC algorithm.

For example, when one or more node devices quit a third node clock domain at the same time, the following two cases exist:

In the first case, at least one node device quits the third node clock domain, and if a node device such as a first node device determines that a second clock data set of the first node device has been marked, the first node device deletes the mark. Each node device that quits the third node clock domain computes a first master clock by using a first clock data set again, and synchronizes to the first master clock. In the second case, if the third node clock domain is split into a first node clock domain and a second node clock domain, a first node device belongs to the first node clock domain, a second node device belongs to the second node clock domain, and a second master clock of the original third node clock domain belongs to the second node device, the second master clock does not need to be re-computed in the second node clock domain used as a node clock domain that has the second node device. The first node clock domain does not have the second node device, and if a second clock data set of a node device in the first node clock domain has been marked, each node device deletes the mark, and computes the second master clock by using second clock data sets of all node devices in the first node clock domain.

Figure 8:
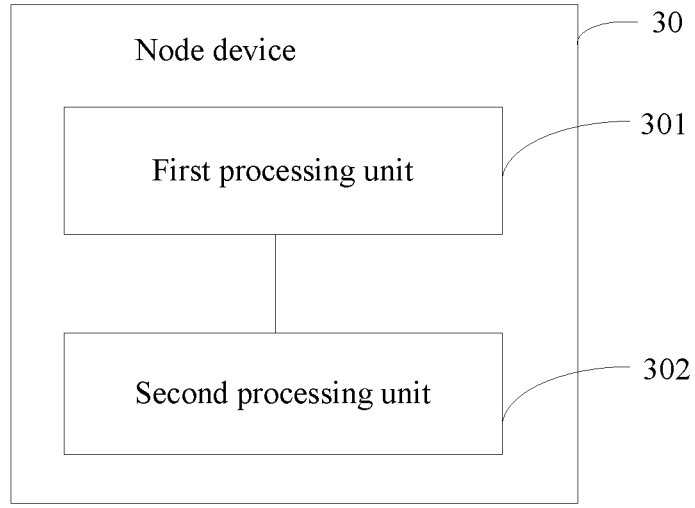
FIG. 8 is a schematic structural diagram of an embodiment of a node device.

FIG. 8 is a schematic structural diagram of an embodiment of a node device. As shown in FIG. 8, a node device 30 is a first node device, including a first processing unit 301 and a second processing unit 302.

The first processing unit 301 is configured to determine a first master clock according to a first clock data set of the first node device and a first clock data set of another node device in a network, and synchronize to the first master clock, where the first clock data set includes a first clock domain selection parameter of a node device. The second processing unit 302 is configured to determine a second master clock according to a second clock data set of the first node device and a second clock data set of another node device that belongs to a same first node clock domain as the first node device does, and synchronize to the second master clock, where the second clock data set includes a second clock domain selection parameter of a node device, and a node clock domain is a second clock domain.

Further, the first processing unit 301 may be configured to determine the first master clock by using a BMC algorithm; and the second processing unit 302 may be configured to determine the second master clock by using the BMC algorithm.

Figure 9:
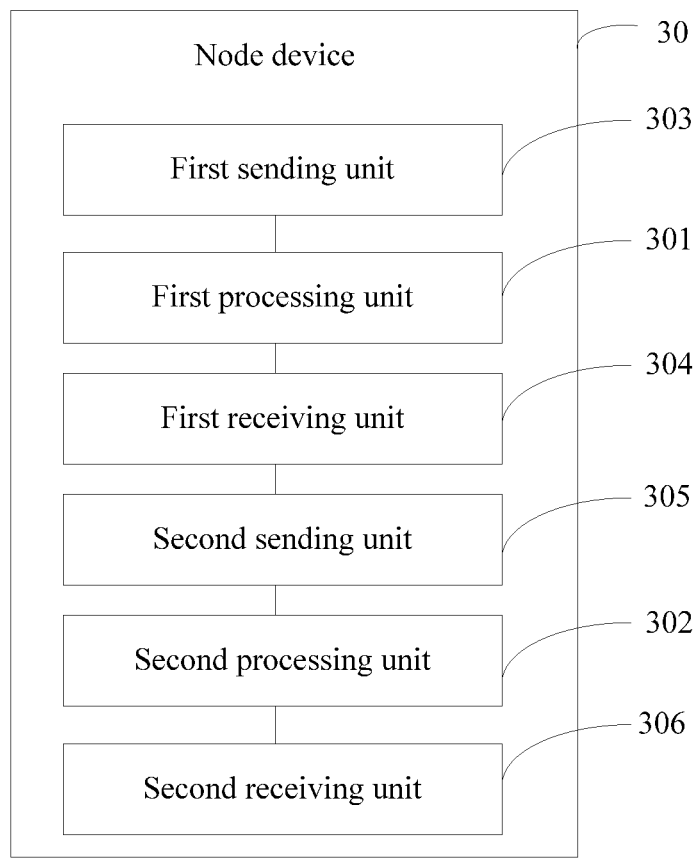
FIG. 9 is a schematic structural diagram of still another embodiment of a node device.

FIG. 9 is a schematic structural diagram of another embodiment of a first node device according to the present invention. As shown in FIG. 9, based on a structure of the device shown in FIG. 8, further, a node device 30 in this embodiment may further include: a first sending unit 303, a first receiving unit 304, a second sending unit 305, and a second receiving unit 306.

The first sending unit 303 is configured to send the first clock data set of the first node device to the another node device in the network.

The first receiving unit 304 is configured to receive the first clock data set sent by the another node device in the network.

The second sending unit 305 is configured to send the second clock data set of the first node device to the another node device in the first node clock domain.

The second receiving unit 306 is configured to receive the second clock data set sent by the another node device in the first node clock domain.

Further, the second receiving unit 306 is further configured to receive a first notification message sent by a communications controller, where the first notification message is used to instruct the first node device to perform synchronization in the second clock domain with the another node device in the first node clock domain.

Further, the second receiving unit 306 is further configured to receive a second notification message sent by the communications controller, where the second notification message is used to instruct the first node device to perform synchronization in the second clock domain with another node device in a second node clock domain, and carries a second master clock of the second node clock domain; and the second processing unit 302 is further configured to synchronize to the second master clock of the second node clock domain.

Optionally, the second receiving unit 306 is further configured to receive a second notification message sent by the communications controller, where the second notification message is used to instruct the first node device to perform synchronization in the second clock domain with a node device in a second node clock domain, and carries an instruction for marking the second clock data set of the first node device, where the mark is used to indicate that the second clock data set does not participate in calculation of the BMC algorithm; the second processing unit 302 is further configured to mark the second clock data set of the first node device; the first sending unit 303 is further configured to send the marked second clock data set to another node device in the second node clock domain; the first receiving unit 304 is further configured to receive a second clock data set sent by the another node device in the second node clock domain; and the second processing unit 302 is further configured to determine a second master clock by using the BMC algorithm and according to an unmarked second clock data set in the second clock data set sent by the another node device in the second node clock domain, and synchronize to the second master clock.

Still optionally, the second receiving unit 306 is further configured to receive a second notification message sent by the communications controller, where the second notification message is used to instruct the first node device to perform synchronization in the second clock domain with another node device in a second node clock domain; the first receiving unit 304 is further configured to receive a second clock data set sent by the another node device in the second node clock domain; and the second processing unit 302 is further configured to determine a second master clock by using the BMC algorithm and according to second clock data sets of all node devices in the second node clock domain, and synchronize to the second master clock.

Figure 10:
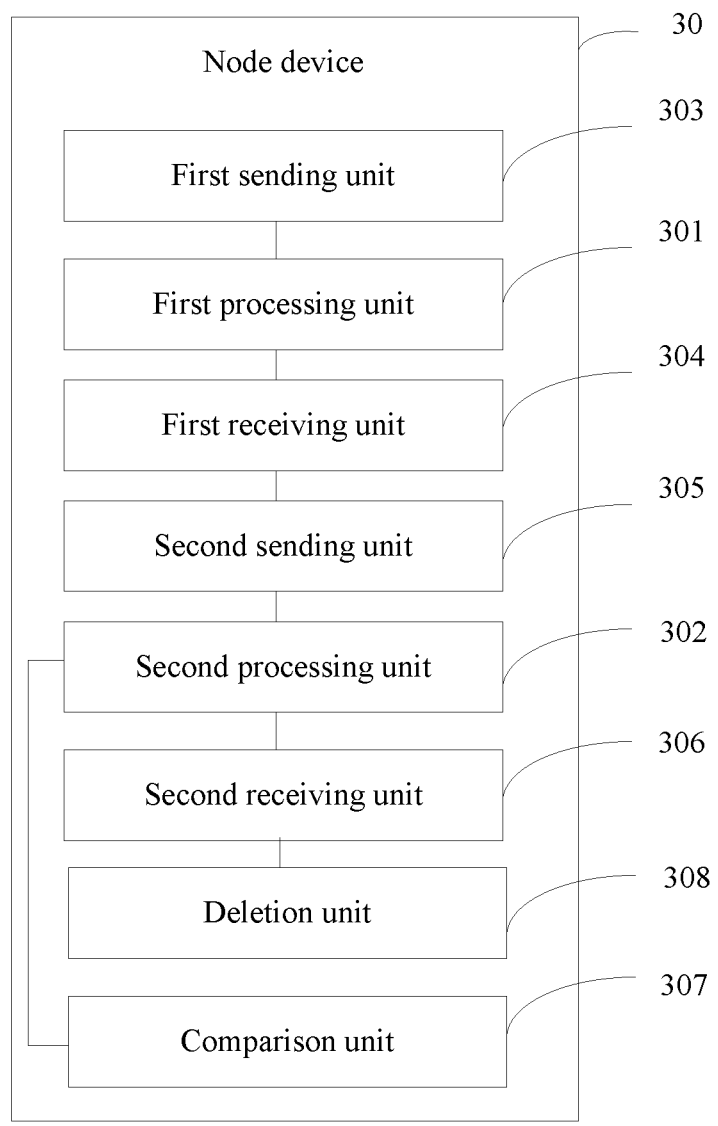
FIG. 10 is a schematic structural diagram of another embodiment of a first node device.

FIG. 10 is a schematic structural diagram of still another embodiment of a first node device. As shown in FIG. 10, on a basis of a structure of the apparatus shown in FIG. 9, further, a node device 30 in this embodiment may further include: a comparison unit 307 and a deletion unit 308.

The comparison unit 307 is configured to: after the second processing unit 302 determines the second master clock, if determining that a time path from the first node device to a node device to which the second master clock belongs is greater than a time path from the first node device to a node device to which the first master clock belongs, enable the first processing unit 301 to determine to synchronize to the first master clock.

Further, the second receiving unit 306 is further configured to receive a third notification message sent by the communications controller, where the third notification message is used to instruct the first node device not to synchronize to the second master clock anymore. The first processing unit 301 is further configured to determine the first master clock according to the first clock data set of the first node device and the received first clock data set of the another node device in the network, and synchronize to the first master clock.

The deletion unit 308 is configured to: after the second receiving unit 306 receives the third notification message, if determining that the second clock data set of the first node device has been marked, delete the mark, where the mark is used to indicate that the second clock data set does not participate in calculation of the BMC algorithm.

According to the node device provided in this embodiment of the present invention, a first node device in a network determines a first master clock according to a first clock data set of the first node device and a first clock data set of another node device in the network, and synchronizes to the first master clock, where the first clock data set includes a first clock domain selection parameter of a node device; and the first node device determines a second master clock according to a second clock data set of the first node device and a second clock data set of another node device that belongs to a same first node clock domain as the first node device does, and synchronizes to the second master clock, where the second clock data set includes a second clock domain selection parameter of a node device, and a node clock domain is a second clock domain. In this way, by means of a hierarchical multi-clock domain clock synchronization method, a first node in a different clock domain may compute a master clock of the clock domain and synchronize to the master clock, which avoids an error accumulation problem caused by an excessively long transmission path of the master clock. In addition, the first node device implements high-precision synchronization when located in a first clock domain, and the first node device can implement higher-precision synchronization when located in a second clock domain, which not only meets a further requirement on higher precision in the second clock domain, but also avoids a problem of extremely high deployment costs caused by extremely high precision improvement in an entire network.

Figure 11:
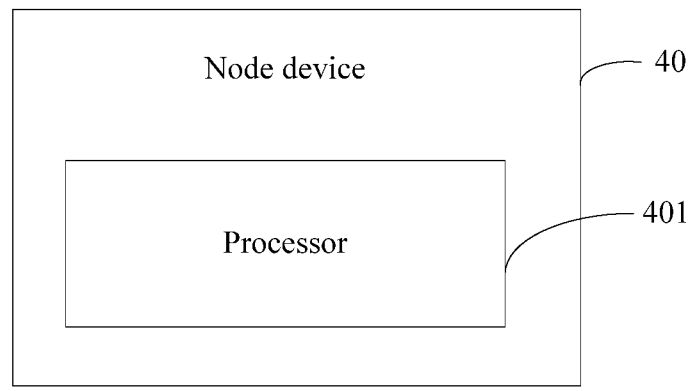
FIG. 11 is a schematic structural diagram of still another embodiment of a first node device.

FIG. 11 is a schematic structural diagram of an embodiment of another node device according to the present invention. As shown in FIG. 11, a node device 40 is a first node device, including a processor 401.

The processor 401 is configured to determine a first master clock according to a first clock data set of the first node device and a first clock data set of another node device in a network, and synchronize to the first master clock, where the first clock data set includes a first clock domain selection parameter of a node device. The processor 401 is further configured to determine a second master clock according to a second clock data set of the first node device and a second clock data set of another node device that belongs to a same first node clock domain as the first node device does, and synchronize to the second master clock, where the second clock data set includes a second clock domain selection parameter of a node device, and a node clock domain is a second clock domain.

Further, the processor 401 is specifically configured to determine the first master clock or the second master clock by using a best master clock BMC algorithm.

Still further, the processor 401 is further configured to: after determining the second master clock, if determining that a time path from the first node device to a node device to which the second master clock belongs is greater than a time path from the first node device to a node device to which the first master clock belongs, synchronize to the first master clock.

Figure 12:
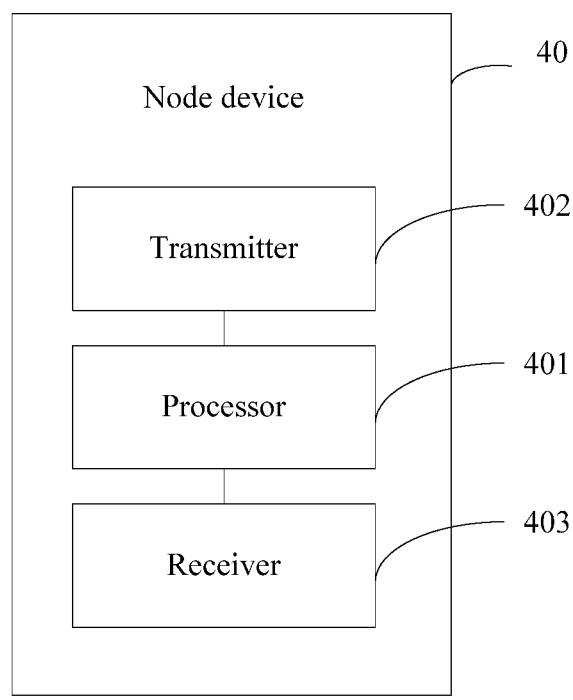
FIG. 12 is a schematic structural diagram of an embodiment of another node device.

FIG. 12 is a schematic structural diagram of another embodiment of a first node device. As shown in FIG. 12, on a basis of a structure of the apparatus shown in FIG. 11, further, a node device 40 in this embodiment may further include: a transmitter 402 and a receiver 403.

The transmitter 402 is configured to send the first clock data set of the first node device to the another node device in the network.

The receiver 403 is configured to receive the first clock data set sent by the another node device in the network.

The transmitter 402 is further configured to send the second clock data set of the first node device to the another node device in the first node clock domain.

The receiver 403 is further configured to receive the second clock data set sent by the another node device in the first node clock domain.

Further, the receiver 403 is further configured to receive a first notification message sent by a communications controller, where the first notification message is used to instruct the first node device to perform synchronization in the second clock domain with the another node device in the first node clock domain.

Further, the receiver 403 is further configured to receive a second notification message sent by the communications controller, where the second notification message is used to instruct the first node device to perform synchronization in the second clock domain with another node device in a second node clock domain, and carries a second master clock of the second node clock domain; and the processor 401 is further configured to synchronize to the second master clock of the second node clock domain.

Optionally, the receiver 403 is further configured to receive a second notification message sent by the communications controller, where the second notification message is used to instruct the first node device to perform synchronization in the second clock domain with a node device in a second node clock domain, and carries an instruction for marking the second clock data set of the first node device, where the mark is used to indicate that the second clock data set does not participate in calculation of the BMC algorithm; the processor 401 is further configured to mark the second clock data set of the first node device; the transmitter 402 is further configured to send the marked second clock data set to another node device in the second node clock domain; the receiver 403 is further configured to receive a second clock data set sent by the another node device in the second node clock domain; and the processor 401 is further configured to determine a second master clock by using the BMC algorithm and according to an unmarked second clock data set in the second clock data set sent by the another node device in the second node clock domain, and synchronize to the second master clock.

Optionally, the receiver 403 is further configured to receive a second notification message sent by the communications controller, where the second notification message is used to instruct the first node device to perform synchronization in the second clock domain with another node device in a second node clock domain; and receive a second clock data set sent by the another node device in the second node clock domain; and the processor 401 is further configured to determine a second master clock by using the BMC algorithm and according to second clock data sets of all node devices in the second node clock domain, and synchronize to the second master clock.

Further, the processor 401 is further configured to: after determining the second master clock, if determining that a time path from the first node device to a node device to which the second master clock belongs is greater than a time path from the first node device to a node device to which the first master clock belongs, synchronize to the first master clock.

Still further, the receiver 403 is further configured to receive a third notification message sent by the communications controller, where the third notification message is used to instruct the first node device not to synchronize to the second master clock anymore; and the processor 401 is further configured to determine the first master clock according to the first clock data set of the first node device and the received first clock data set of the another node device in the network, and synchronize to the first master clock.

The processor 401 is further configured to: after the receiver 403 receives the third notification message, if determining that the second clock data set of the first node device has been marked, delete the mark, where the mark is used to indicate that the second clock data set does not participate in calculation of the BMC algorithm.

According to the node device provided in this embodiment, a first node device in a network determines a first master clock according to a first clock data set of the first node device and a first clock data set of another node device in the network, and synchronizes to the first master clock, where the first clock data set includes a first clock domain selection parameter of a node device; and the first node device determines a second master clock according to a second clock data set of the first node device and a second clock data set of another node device that belongs to a same first node clock domain as the first node device does, and synchronizes to the second master clock, where the second clock data set includes a second clock domain selection parameter of a node device, and a node clock domain is a second clock domain. In this way, by means of a hierarchical multi-clock domain clock synchronization method, a first node in a different clock domain may compute a master clock of the clock domain and synchronize to the master clock, which avoids an error accumulation problem caused by an excessively long transmission path of the master clock. In addition, the first node device implements high-precision synchronization when located in a first clock domain, and the first node device can implement higher-precision synchronization when located in a second clock domain, which not only meets a further requirement on higher precision in the second clock domain, but also avoids a problem of extremely high deployment costs caused by extremely high precision improvement in an entire network.

Figure 13:
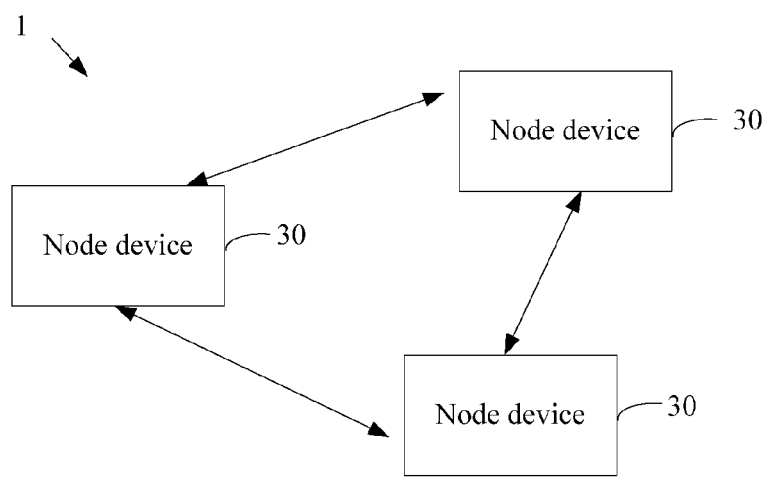
FIG. 13 is a schematic structural diagram of another embodiment of a communications system.

FIG. 13 is a schematic structural diagram of an embodiment of a communications system. The system 1 includes at least two node devices 30.

In the system, the node device 30 may use a structure of any node device 30 shown in FIG. 8 to FIG. 10.

Figure 14:
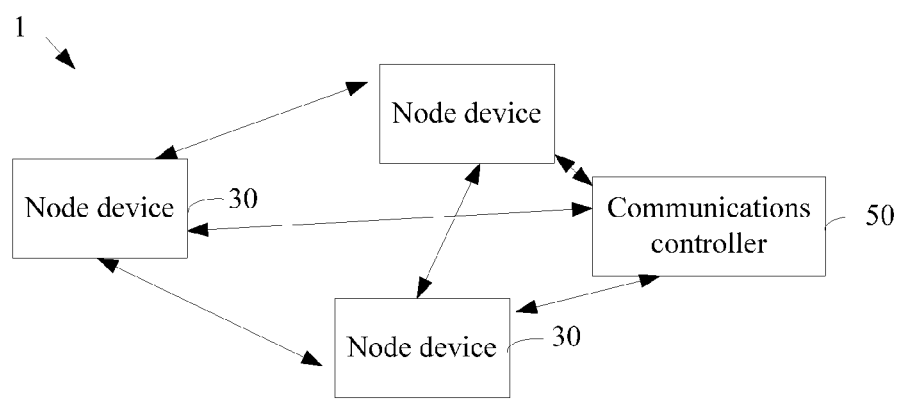
FIG. 14 is a schematic structural diagram of an embodiment of a communications system.

Further, FIG. 14 is a schematic structural diagram of another embodiment of a communications system. As shown in FIG. 14, on a basis of a structure of the system shown in FIG. 13, further, a system 1 in this embodiment may further include a communications controller 50.

The communications controller 50 is configured to: send a first notification message to a first node device in the at least two node devices, where the first notification message is used to instruct the first node device to perform synchronization in a second clock domain with another node device in a first node clock domain; send a second notification message to the first node device, where the second notification message is used to instruct the first node device to perform synchronization in the second clock domain with a node device in a second node clock domain, and carries a second master clock of the second node clock domain; or, the second notification message is used to instruct the first node device to perform synchronization in the second clock domain with a node device in a second node clock domain, and carries an instruction for marking a second clock data set of the first node device, where the mark is used to indicate that the second clock data set does not participate in calculation of a BMC algorithm; or, the second notification message is used to instruct the first node device to perform synchronization in the second clock domain with another node device in a second node clock domain; and send a third notification message to the first node device, where the third notification message is used to instruct the first node device not to synchronize to the second master clock anymore.

Alternatively, the communications system includes at least one node device 40.

The node device 40 may use a structure of the node device 40 shown in FIG. 10 or FIG. 11.

Further, the system further includes a communications controller.

The communications controller is configured to: send a first notification message to a first node device in the at least two node devices, where the first notification message is used to instruct the first node device to perform synchronization in a second clock domain with another node device in a first node clock domain; send a second notification message to the first node device, where the second notification message is used to instruct the first node device to perform synchronization in the second clock domain with a node device in a second node clock domain, and carries a second master clock of the second node clock domain; or, the second notification message is used to instruct the first node device to perform synchronization in the second clock domain with a node device in a second node clock domain, and carries an instruction for marking a second clock data set of the first node device, where the mark is used to indicate that the second clock data set does not participate in calculation of a BMC algorithm; or, the second notification message is used to instruct the first node device to perform synchronization in the second clock domain with another node device in a second node clock domain; and send a third notification message to the first node device, where the third notification message is used to instruct the first node device not to synchronize to the second master clock anymore.

The communications system in this embodiment may be used to perform the technical solutions of the method embodiments shown in FIG. 1 to FIG. 7, and implementation principles and technical effects of the communications system are similar to implementation principles and technical effects of the method embodiments shown in FIG. 1 to FIG. 7 and are not described herein again.

According to the communications system provided in this embodiment, a first node device in a network determines a first master clock according to a first clock data set of the first node device and a first clock data set of another node device in the network, and synchronizes to the first master clock, where the first clock data set includes a first clock domain selection parameter of a node device; and the first node device determines a second master clock according to a second clock data set of the first node device and a second clock data set of another node device that belongs to a same first node clock domain as the first node device does, and synchronizes to the second master clock, where the second clock data set includes a second clock domain selection parameter of a node device, and a node clock domain is a second clock domain. In this way, by means of a hierarchical multi-clock domain clock synchronization method, a first node in a different clock domain may compute a master clock of the clock domain and synchronize to the master clock, which avoids an error accumulation problem caused by an excessively long transmission path of the master clock. In addition, the first node device implements high-precision synchronization when located in a first clock domain, and the first node device can implement higher-precision synchronization when located in a second clock domain, which not only meets a further requirement on higher precision in the second clock domain, but also avoids a problem of extremely high deployment costs caused by extremely high precision improvement in an entire network.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
   determining, by a first node device in a network, a first master clock of the network, and synchronizing, by the first node device, to the first master clock;
   receiving, by the first node device, a first notification message sent by a communications controller, wherein the first notification message instructs the first node device to perform synchronization with a second node device, and the first notification message carries an instruction for marking a clock data set of the first node device, wherein the marking indicates that the clock data set of the first node device does not participate in calculation of a best master clock (BMC) algorithm;
   marking, by the first node device, the clock data set of the first node device;

sending, by the first node device, the marked clock data set of the first node device to the second node device;

receiving, by the first node device, a clock data set of the second node device;

determining, by the first node device, a second master clock using the BMC algorithm and according to an unmarked clock data set in the received clock data set of the second node device synchronizing, by the first node device, to the second master clock, wherein the second master clock is different from the first master clock; and conducting, by the first node device, coordinated multipoint transmission and reception between the first node device and another device, wherein the another device is the second node device or a third node device, and wherein the second node device and the third node device belong to a same clock domain.

2. The method according to claim 1, wherein determining the first master clock comprises:
determining the first master clock using the BMC algorithm.

3. The method according to claim 1, wherein determining the second master clock comprises:
determining the second master clock using the BMC algorithm.

4. The method according to claim 1, wherein the clock data set of the first node device and the clock data set of the second node device in the network are obtained after precision improvement processing.

5. The method according to claim 1, wherein the first notification message carries the second master clock.

6. The method according to claim 1, wherein determining the second master clock comprises:
determining, by the first node device, the second master clock by using the BMC algorithm and according to clock data sets of one or more fourth node devices, wherein the second node device and the one or more fourth node devices belong to the same clock domain.

7. The method according to claim 1, wherein after synchronizing to the second master clock, the method further comprises:
receiving, by the first node device, a second notification message sent by the communications controller, wherein the second notification message instructs the first node device not to synchronize to the second master clock anymore; and
after receiving the second notification message, determining, by the first node device, the first master clock, and re-synchronizing to the first master clock.

8. A first node device, comprising:
a receiver, configured to receive a first notification message sent by a communications controller, wherein the first notification message instructs the first node device to perform synchronization with a second node device, and the first notification message carries an instruction for marking a clock data set of the first node device, wherein the mark indicates that the clock data set of the first node device does not participate in calculation of a best master clock (BMC) algorithm;
a transmitter, configured to send, by the first node device, the marked clock data set of the first node device to the second node device; and
a processor, configured to:
determine a first master clock of a network, and to synchronize to the first master clock;
mark the clock data set of the first node device;
determine a second master clock using the BMC algorithm and according to an unmarked clock data set in the received clock data set of the second node device
synchronize to the second master clock, wherein the second master clock is different from the first master clock; and
conduct coordinated multipoint transmission and reception between the first node device and another node device, wherein the another node device is the second node device or a third node device, and wherein the second node device and the third node device belong to a same clock domain.

9. The first node device according to claim 8, wherein the processor is further configured to determine the first master clock or the second master clock using the BMC algorithm.

10. The first node device according to claim 8, wherein the clock data set of the first node device and the clock data set of the second node device in the network are obtained after precision improvement processing.

11. The first node device according to claim 8, wherein the first notification message carries the second master clock.

12. The first node device according to claim 8, wherein the processor is further configured to determine the second master clock by using the BMC algorithm and according to clock data sets of one or more fourth node devices, wherein the second node device and the one or more fourth node devices belong to the same clock domain.

13. The first node device according to claim 8, further comprising:
a receiver, configured to receive a second notification message sent by the communications controller, wherein the second notification message instructs the first node device not to synchronize to the second master clock anymore;
wherein the processor is further configured to, after the receiver receives the second notification message, determine the first master clock, and to re-synchronize to the first master clock.

14. A communications system, comprising a plurality of node devices in a network and a communications controller, wherein a first node device of the plurality of node devices comprises:
a processor, configured to:
determine a first master clock of the network, and to synchronize to the first master clock;
determine a second master clock according to a clock data set of the first node device and a clock data set of a second node device of the plurality of node devices, and synchronize to the second master clock, wherein the second master clock is different from the first master clock; and
conduct coordinated multipoint transmission and reception between the first node device and another node device of the plurality of node devices, wherein the another node device is the second node device or a third node device of the plurality of node devices, and wherein the second node device and the third node device belong to a same clock domain;
wherein the communications controller is configured to:
send a first notification message to the first node device, wherein the first notification message instructs the first node device to perform synchronization in a clock domain with the second node device;
send a second notification message to the first node device, wherein the second notification message instructs the first node device to perform synchronization in the clock domain with a fourth node device of the plurality of node devices, and the second notification message carries an instruction for marking a second clock data set of the first node device, wherein the mark indicates that the second clock data set of the first node device does not participate in calculation of a best master clock (BMC) algorithm; and send a third notification message to the first node device, wherein the third notification message is instructs the first node device not to synchronize to the second master clock anymore.

15. The communications system according to claim 14, further comprising a communications controller, configured to:

send a fourth notification message to the first node device, wherein the fourth notification message instructs the first node device to perform synchronization in the clock domain with the third node device, and carries the second master clock; and send a fifth notification message to the first node device, wherein the fifth notification message instructs the first node device not to synchronize to the second master clock anymore.

* * * * *